UNITED STATES PATENT OFFICE.

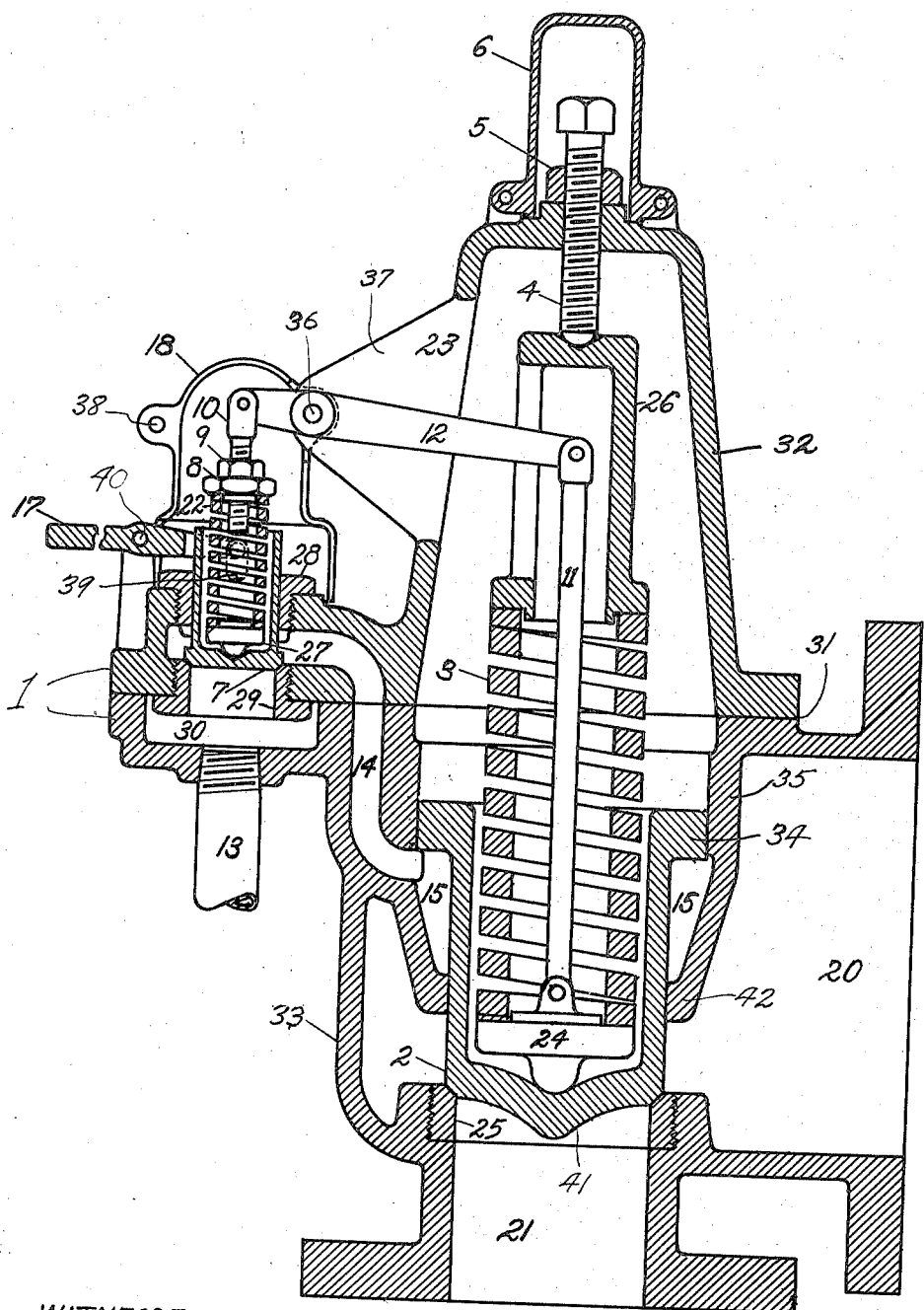

HERBERT B. MORRILL, OF SALEM, MASSACHUSETTS.

PRESSURE-RELIEF APPARATUS.

1,290,291.  Specification of Letters Patent.  Patented Jan. 7, 1919.

Application filed March 18, 1918. Serial No. 223,061.

*To all whom it may concern:*

Be it known that I, HERBERT B. MORRILL, a citizen of the United States of America, and resident of Salem, in the county of Essex and State of Massachusetts, have invented new and useful Improvements in Pressure-Relief Apparatus, of which the following is a specification.

This invention relates to apparatus for regulating fluid pressure in a closed space and more particularly to a safety valve for steam boilers and the like.

Heretofore it has been customary to employ a single pop-off valve adjusted to pop off at a predetermined pressure for relieving the pressure in steam boilers and the like. A valve of this type possesses certain inherent characteristics which render it unsatisfactory for many uses, but particularly for use on high pressure boilers now employed for operating steam turbines and other high pressure apparatus. It has been proposed to employ a pilot valve in conjunction with a relief valve, but so far as I am aware no device of this character has been produced in which the valves are so associated together as satisfactorily to perform their intended functions, particularly where large volumes and high pressures are involved.

The principal objects of the present invention are to provide pressure relief apparatus which will relieve pressure when it reaches a certain magnitude, which will permit the rapid escape of steam or other fluid, which can be adjusted to open a small or large amount depending upon the rate at which the steam is being generated, which can be adjusted to close at a pressure substantially equal to the pressure at which it opens, and which is thoroughly safe and reliable.

The aforesaid objects are attained according to the present invention by means of a relief valve and a pilot valve associated together so as mutually to control each other. The relief valve closes a relief passageway leading from the closed space containing the fluid under pressure, and the pilot valve is arranged to open the relief valve at a predetermined pressure. The pilot valve preferably controls the relief valve by controlling a passageway leading from the closed space to the relief valve, the relief valve being provided with a piston head or other suitable means for opening the valve in response to pressure. While the relief valve may be actuated solely by the fluid passing through the pilot valve, the action of this fluid is preferably supplemented by the fluid pressure in the closed space acting directly upon the relief valve. The valves are held closed by yielding means acting against the pressure in the closed space and I preferably provide separate yielding means for the respective valves.

The mutual control of the valves involves means arranged between the two valves so as to tend to close the pilot valve when the relief valve opens, and this means preferably comprises mechanism connecting at its opposite ends to the respective valves. The control means extending between the valves may be connected directly to one valve at one end and at the other end to the yielding means associated with the other valve or it may be connected at its opposite ends respectively to the yielding means associated with the respective valves, but I preferably connect it directly to the relief valve and indirectly to the pilot valve through the yielding means associated therewith.

In the accompanying drawings the figure shows a vertical longitudinal central section through the preferred embodiment of my invention, and it will be understood that the invention in its various aspects may be embodied in other forms with more or less satisfactory results.

The particular embodiment of my invention illustrated in the accompanying drawing comprises a casing 1 divided along the horizontal line 31 into upper and lower portions 32 and 33. The lower portion of the casing is provided with a passageway 20—21 for permitting the escape of steam or other fluid, the passage 20 communicating with the atmosphere and the passage 21 communicating with the steam boiler or other closed space containing fluid under pressure. A vertically reciprocating relief valve 2 is arranged to control the passageway 20—21, the valve seating at its lower end on a valve seat 25 threaded into the upper end of passage 21.

The relief valve 2 is cup-shaped and is provided at its upper end with an outwardly extending flange 34 fitting loosely into a cylindrical portion 35 of the casing 33. The lower end of the cylinder 35 is tapered inwardly and fits loosely around the relief valve intermediate its upper and lower ends, thereby providing an annular chamber 15 around the relief valve beneath the flange 34. A pressure equalizer 24 of the customary type is arranged to engage the upper side of the relief valve at its central point, and a compression spring 3 bears against the upper side of the equalizer 24. A stop 26 bears against the upper end of the spring 3 and an adjusting screw 4 is threaded through the top of the casing 32 into engagement with the upper end of the stop 36, a lock-nut 5 being provided to lock the screw 4 in adjusted position. Over the top of the screw 4 is provided a cup-shaped housing 6 to inclose the adjusted screw and lock-nut.

Extending from the annular chamber 15 is a passageway 14 which communicates with a chamber 30 in the left-hand side of the lower casing 33. Leading downwardly from the chamber 30 is a pipe 13 adapted to communicate with the closed space containing the fluid under pressure. The pilot valve 7 is arranged to seat on a valve seat 29 threaded into the opening between passageway 14 and chamber 30 to close the conduit comprising pipe 13 and passageway 14. The pilot valve 7 is cup-shaped and the upper portion thereof is arranged to slide vertically in a collar 28 threaded into an opening in casing 32. The pilot valve 7 is held to its seat against the action of the fluid pressure by means of a compression spring 22 extending between the pressure equalizer 27 and a nut 8 threaded on stem 10, a locknut 9 being provided to lock the nut 8 in adjusted position on the stem 10. The stem 10 is connected to one end of a lever 12 pivotally mounted at 36 on a lug 37, the other end of the lever 12 being pivotally connected to the equalizer 24 through the medium of a connecting link 11. The pilot valve and associated mechanism is inclosed by a housing 18 formed in two parts, the two parts being provided with coöperating lugs 38 for securing the two parts together. The cup-shaped valve 7 is provided on opposite sides with two vertically elongated openings 39, and a yoke lever 17 pivotally mounted at 40 is provided at its right-hand end with fingers extending into the openings 39.

The operation of the apparatus is as follows: The compression of the springs 3 and 22 is so adjusted that both the relief valve and the pilot valve will be held to their seats at pressures less than the predetermined relief pressure and so that the pilot valve will open at a pressure slightly lower than will the relief valve. That is, the springs are so adjusted that the pilot valve will open at a predetermined relief pressure but so that the relief valve will open by pressure on its lower surface 41 only at a pressure somewhat higher than the predetermined relief pressure.

When the pressure in the closed space reaches a predetermined value the pilot valve 7 will open against the action of spring 22 and admit fluid under pressure through passageway 14 to the annular chamber 15. The flange 34 on the upper end of the relief valve constitutes a piston head and the fluid pressure in the annular chamber 15 acting upwardly on this piston head, in conjunction with the upward pressure on the lower surface 41 of the valve, opens the relief valve against the action of spring 3. Steam is then allowed to escape through passageway 20—21. When the pressure has been relieved to a point below the predetermined value the pilot valve 7 closes, thereby cutting off pressure from the piston head 34 to permit the relief valve to be closed by spring 3.

Owing to the fact that the relief valve is connected to the pilot valve through the link 11, lever 12, stem 10 and spring 22, the opening of the relief valve tends to close the pilot valve, this being due to the fact that the compression on spring 22 is increased when the lever 12 is rotated about pivot 36 in a counter-clockwise direction by the opening of the relief valve. Thus the upward force on the pilot valve produced by the upward rush of steam through the opening 29 is counteracted and the pilot valve will close when the pressure has been reduced to substantially the predetermined relief value.

By suitably proportioning the strength of the springs 3 and 22 and the pressure areas of the valves, the apparatus may be caused to respond very accurately to variations in pressure and to relieve the pressure at a slow or rapid rate depending upon the rate at which the steam is being generated.

The arrangement of the parts is such that the opening between passageway 20 and 21 is quite large and when it is necessary to relieve the steam at a very rapid rate, as is frequently necessary in large boilers designed to operate high pressure turbines, the steam can be relieved at a very rapid rate.

Thus the apparatus is adapted to relieve large or small volumes of steam and notwithstanding the fact that it has a large capacity the mutual relationship between the two valves is such that an accurate and reliable operation is afforded whether the volume of steam to be discharged is large or small.

An important feature of the construction comprises a loose fit between the piston head 34 and the cylinder 35, this fit preferably being so loose that some steam escapes around the piston head and thence passes outwardly through opening 23 in the casing 32. By virtue of this loose fit the relief valve operates freely and has practically no tendency to stick. The relief valve may also fit loosely in the lower end 42 of the cylinder 25.

The cardinal feature of my invention, however, comprises the connection between the two valves by virtue of which the extent of opening of the relief valve is determined by the cutting off action of the connection between the two valves. If the pressure in the boiler increases after the relief valve has been slightly opened, the pilot valve is opened still further, more steam is admitted to the annular chamber 15, and the main valve is opened to a greater extent, that is, an increase of pressure in the boiler will cause an increase of opening of the relief valve, even to the extent of its full area if necessary, and vice versa.

If it is desired to test the apparatus at a pressure lower than the relief pressure, the handle 17 is swung downwardly so as to open the pilot valve, thereby admitting steam to the relief valve and opening the relief valve.

Owing to the fact that the steam emitted from passageway 21 rapidly increases in volume as the pressure is reduced, the outlet passage 20 is much larger in cross-sectional area than the passageway 21.

I claim:

1. Pressure relief apparatus comprising a relief valve for relieving pressure, a pilot valve associated with the relief valve so as to open the relief valve when the pressure reaches a certain magnitude, and means controlled by the relief valve tending to close the pilot valve when the relief valve opens.

2. Pressure relief apparatus comprising a relief valve for relieving pressure, a pilot valve associated with the relief valve so as to open the relief valve when the pressure reaches a certain magnitude, and mechanism connecting said two valves together so that opening of the relief valve tends to close the pilot valve.

3. Pressure relief apparatus comprising a relief valve for relieving pressure, a pilot valve associated with the relief valve so as to open the relief valve when the pressure reaches a certain magnitude, a pivoted lever, and means connecting said valves to the lever so that opening of the relief valve tends to close the pilot valve.

4. Pressure relief apparatus comprising a relief valve for relieving pressure, a pilot valve associated with the relief valve so as to open the relief valve when the pressure reaches a certain magnitude, and a lever pivotally mounted intermediate its ends and connected to the respective valves on opposite sides of its pivot so as to tend to close the pilot valve when the relief valve opens.

5. Pressure relief apparatus comprising a relief valve for relieving pressure, a pilot valve arranged to open at a certain pressure and to open the relief valve by admitting pressure thereto, and mechanism including yielding means interposed between the two valves so as to tend to close the pilot valve when the relief valve opens.

6. Apparatus for relieving fluid pressure in a closed space comprising a pilot valve and a relief valve respectively communicating with the closed space, a piston head on the relief valve, a cylinder surrounding the piston head, a conduit extending from the pilot valve to said cylinder so that fluid under pressure is admitted to said cylinder when the pilot valve opens thereby to open the relief valve, and means controlled by the relief valve tending to close the pilot valve when the relief valve opens.

7. Apparatus for relieving fluid pressure in a closed space comprising a casing, the casing having a passageway leading from the closed space, a relief valve for closing said passageway, a piston head on the relief valve, a cylinder surrounding the piston head, a second passageway leading from the closed space to said cylinder, the piston head fitting loosely in the cylinder and the casing having an opening to emit the steam escaping around the piston head, a pilot valve for closing the second passageway, and means for holding said valves closed, the holding means being adjusted to permit the pilot valve to open at a predetermined pressure in the closed space, thereby to open the relief valve by admitting fluid under pressure to said cylinder and means controlled by the relief valve tending to close the pilot valve when the relief valve opens.

8. Apparatus for relieving fluid pressure in a closed space comprising a casing, the casing having a passageway leading from the closed space, a relief valve for closing said passageway, a piston head on the relief valve, a cylinder surrounding the piston head, a second passageway leading from the closed space to said cylinder, a pilot valve for closing the second passageway, means for holding said valves closed, the holding means being adjusted to permit the pilot valve to open at a predetermined pressure in the closed space, thereby to open the relief valve by admitting fluid under pressure to said cylinder, and means controlled by the relief valve tending to close the pilot valve when the relief valve opens.

9. Pressure relief apparatus comprising a relief valve for relieving pressure, a pilot valve for controlling the relief valve, yielding means urging the pilot valve closed, and means interposed between the two valves for increasing the pressure of the yielding means when the relief valve opens.

10. Pressure relief apparatus comprising a relief valve for relieving pressure, a pilot valve for controlling the relief valve, yielding means urging the relief valve closed, other yielding means urging the pilot valve closed, and means interposed between the two valves for increasing the pressure of the second yielding means when the relief valve opens.

11. Pressure relief apparatus comprising a relief valve for relieving pressure, a pilot valve for controlling the relief valve, yielding means urging the relief valve closed, other yielding means urging the pilot valve closed, and means interposed between the two valves for increasing the pressure of the second yielding means when the relief valve opens, the two yielding means being so balanced that the extent of opening of the relief valve is proportionate to the pressure in the closed space.

Signed by me at Boston, Massachusetts, this 11th day of March, 1918.

HERBERT B. MORRILL.